United States Patent [19]
Greenberg

[11] Patent Number: 6,020,993
[45] Date of Patent: *Feb. 1, 2000

[54] 3-D PHOTO ATTACHMENT FOR A 2-D LIGHT MICROSCOPE

[75] Inventor: Gary Greenberg, Los Angeles, Calif.

[73] Assignee: Edge Scientific Instrument Company LLC, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/884,284

[22] Filed: Jun. 27, 1997

Related U.S. Application Data

[60] Continuation-in-part of application No. 08/630,542, Apr. 10, 1996, which is a division of application No. 08/163,924, Dec. 8, 1993, Pat. No. 5,539,572, which is a continuation-in-part of application No. 08/143,484, Oct. 26, 1993, abandoned, which is a continuation-in-part of application No. 07/957,286, Oct. 6, 1992, abandoned.

[51] Int. Cl.[7] ............................. G02B 21/36; G02B 21/22
[52] U.S. Cl. ..................... 359/363; 359/377; 359/464; 359/477; 359/894; 396/432
[58] Field of Search ........................ 359/363, 372, 359/373, 376, 377, 464, 471, 477, 894, 738, 739; 396/432

[56] References Cited

U.S. PATENT DOCUMENTS

| 1,470,670 | 10/1923 | Heimstadt | 359/377 |
| 2,290,874 | 7/1942 | Graff | 359/363 |
| 2,845,842 | 8/1958 | Leitz et al. | 359/363 |
| 2,967,456 | 1/1961 | Maier | 396/432 |
| 3,417,685 | 12/1968 | Kato et al. | 359/377 |
| 3,788,727 | 1/1974 | Abe | 359/377 |
| 3,798,665 | 3/1974 | Eloranta et al. | 396/432 |

OTHER PUBLICATIONS

Axioplan, The Universal Microscope for research in biology and medicine, brochure from Carl Zeiss (1991).
Labophot—2A, brochure from Nikon Inc. (Dec, 1991).

Primary Examiner—Jon Henry
Attorney, Agent, or Firm—H. Michael Brucker

[57] ABSTRACT

A 3-D photo attachment for the phototube of a light microscope which enables a 2-D camera port to be enhanced to take 3-D stereo pair photography both sequentially and simultaneously.

16 Claims, 14 Drawing Sheets

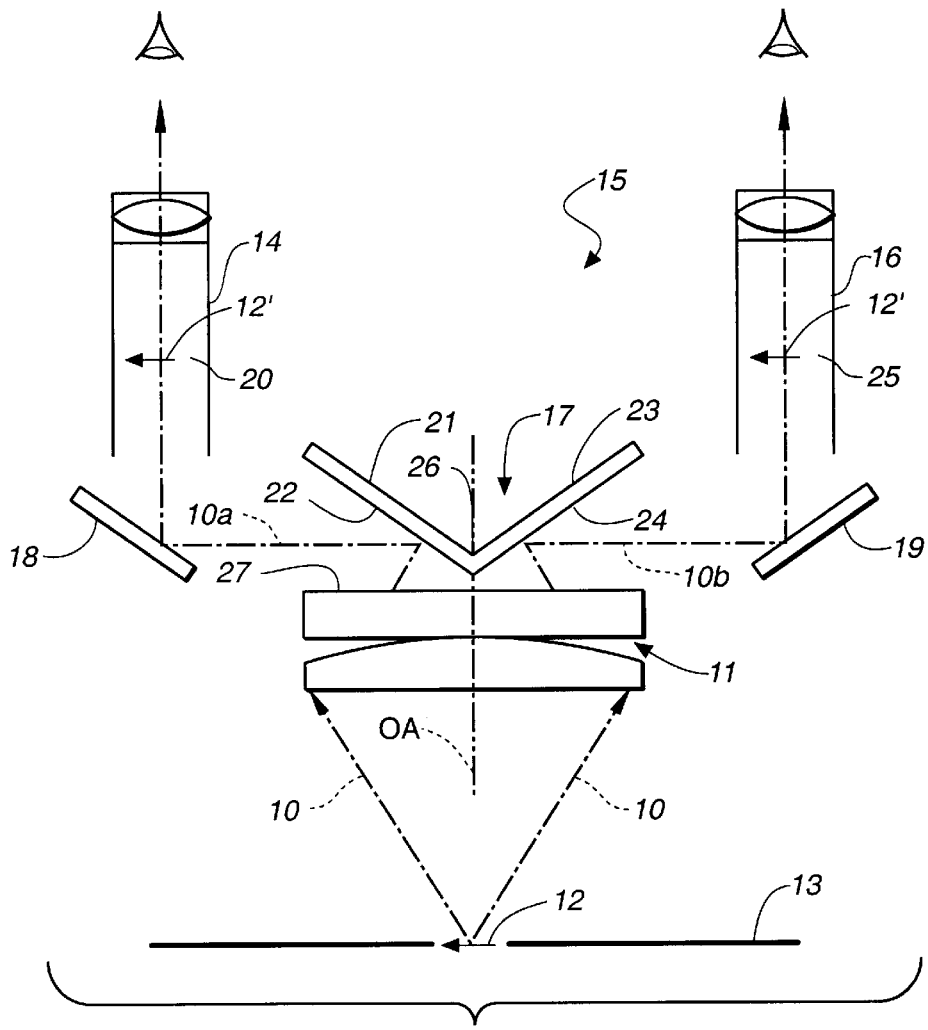
FIG._1
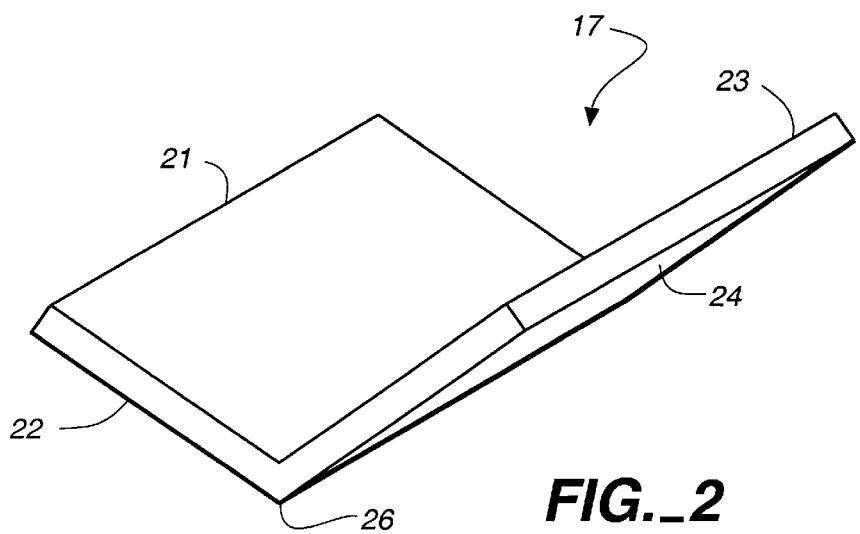
FIG._2

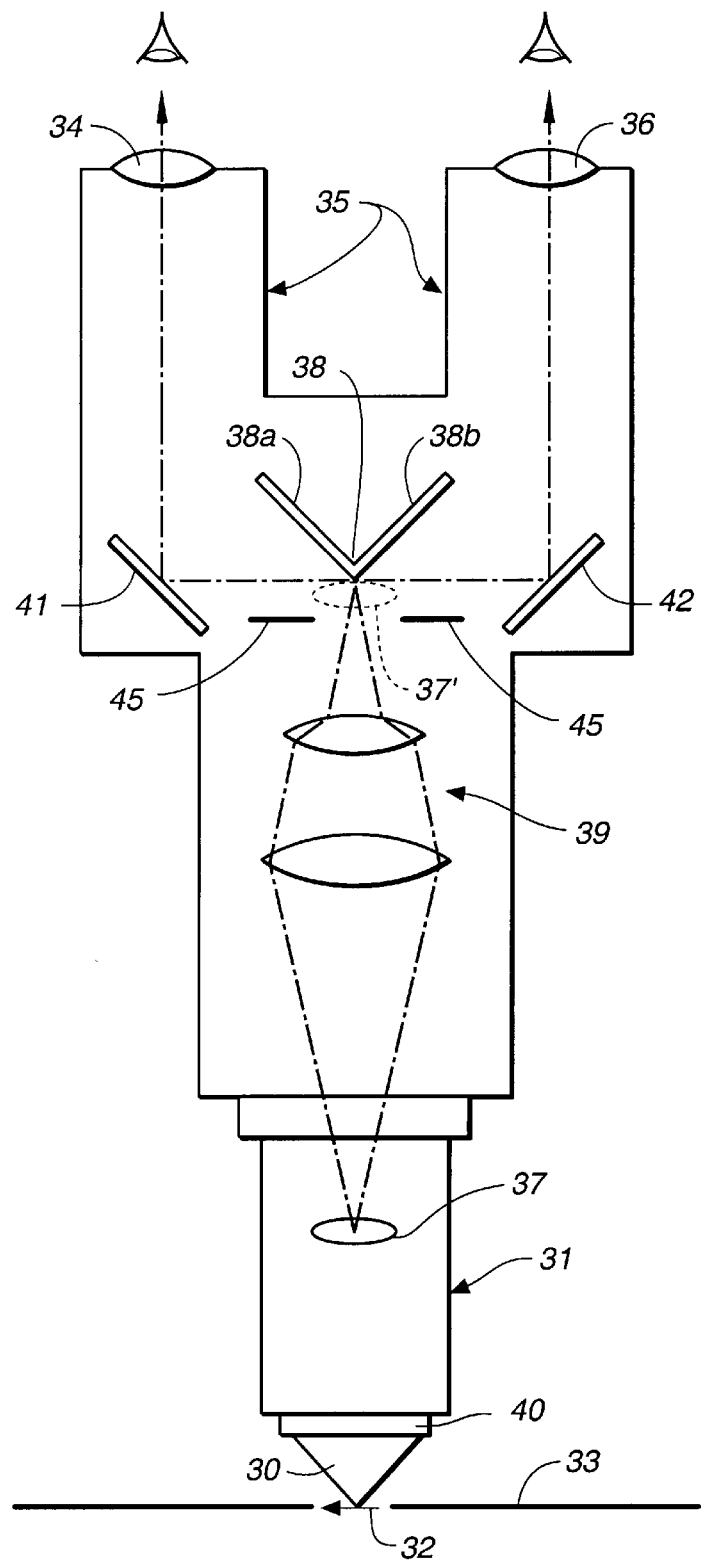
FIG._3

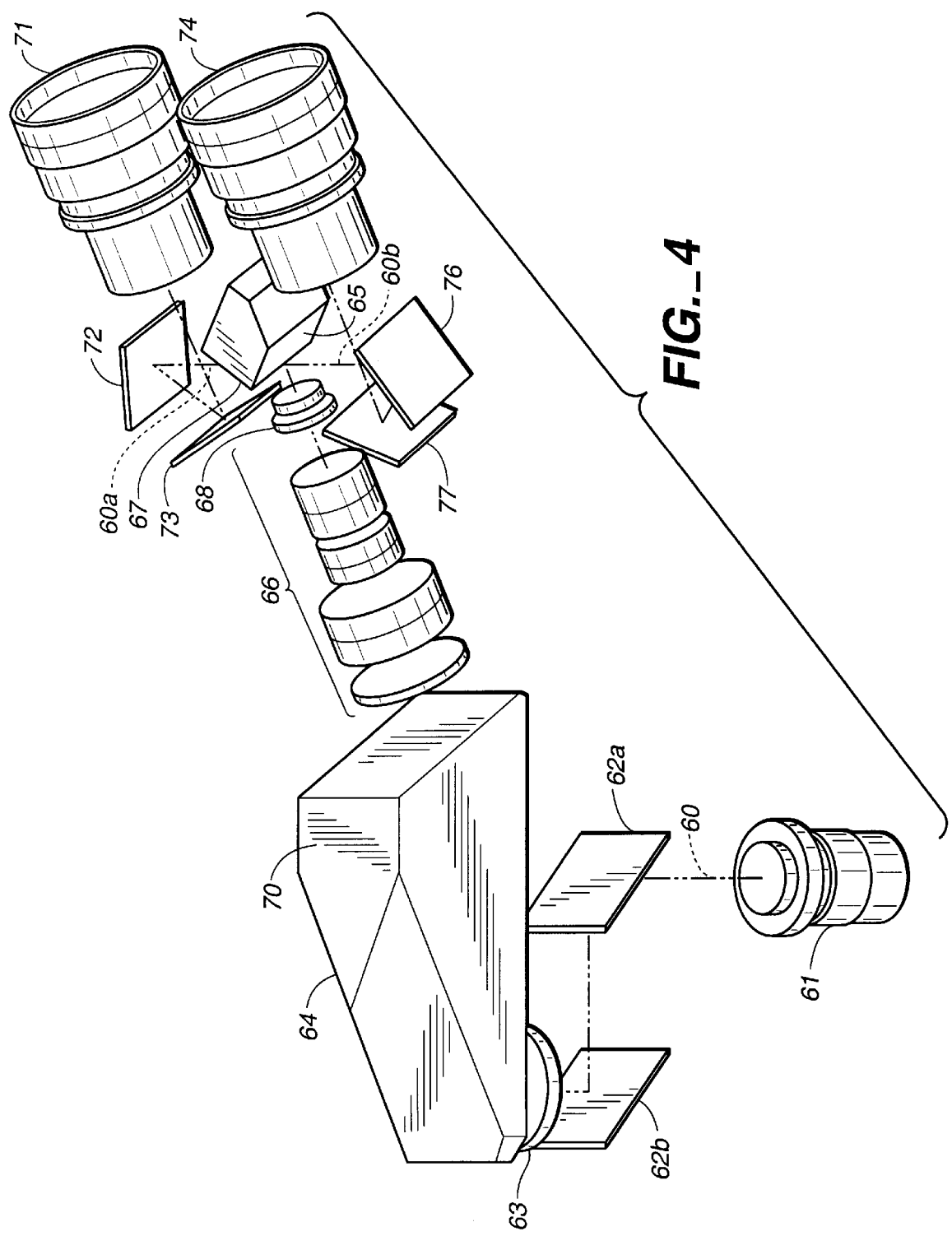
FIG._4

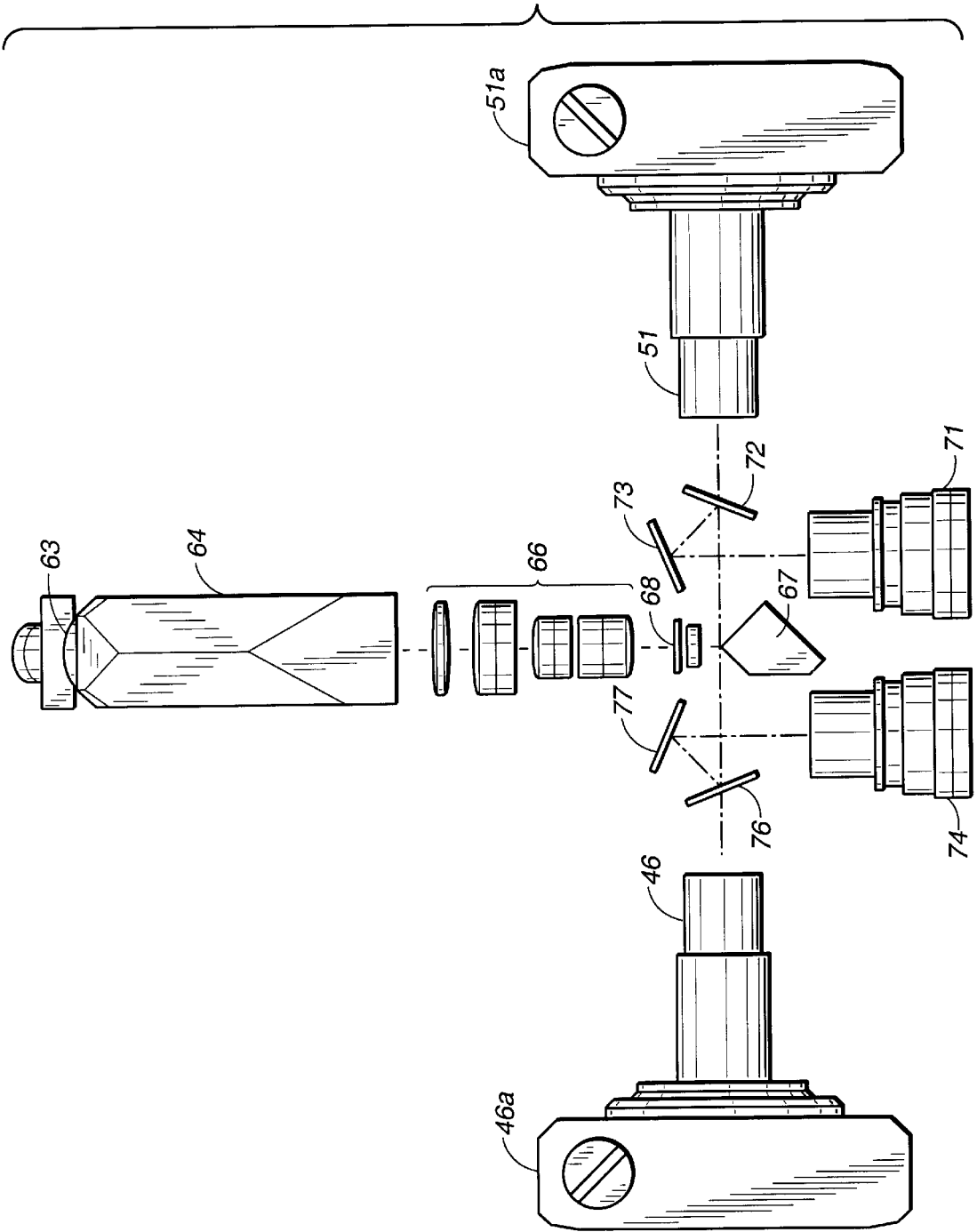

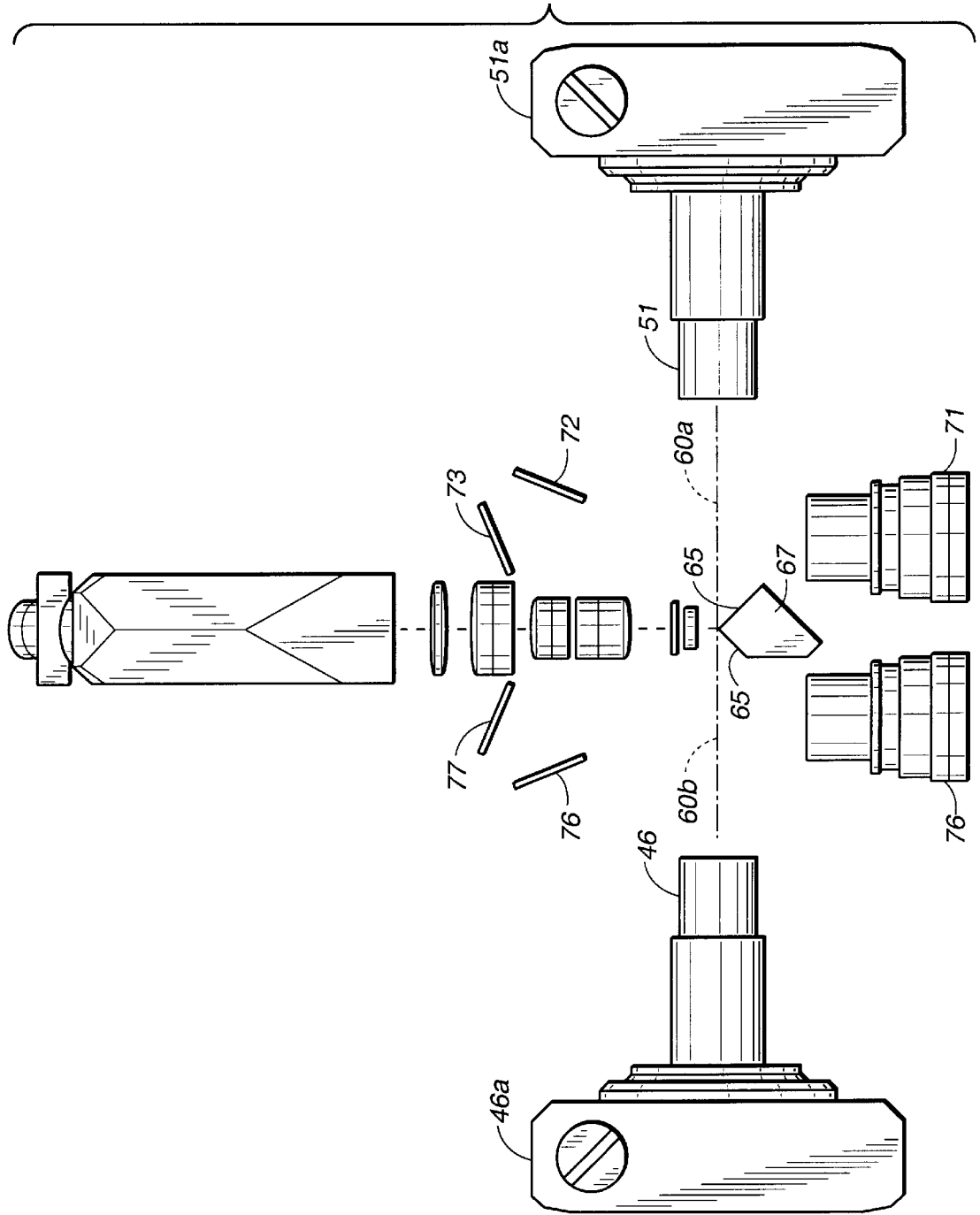

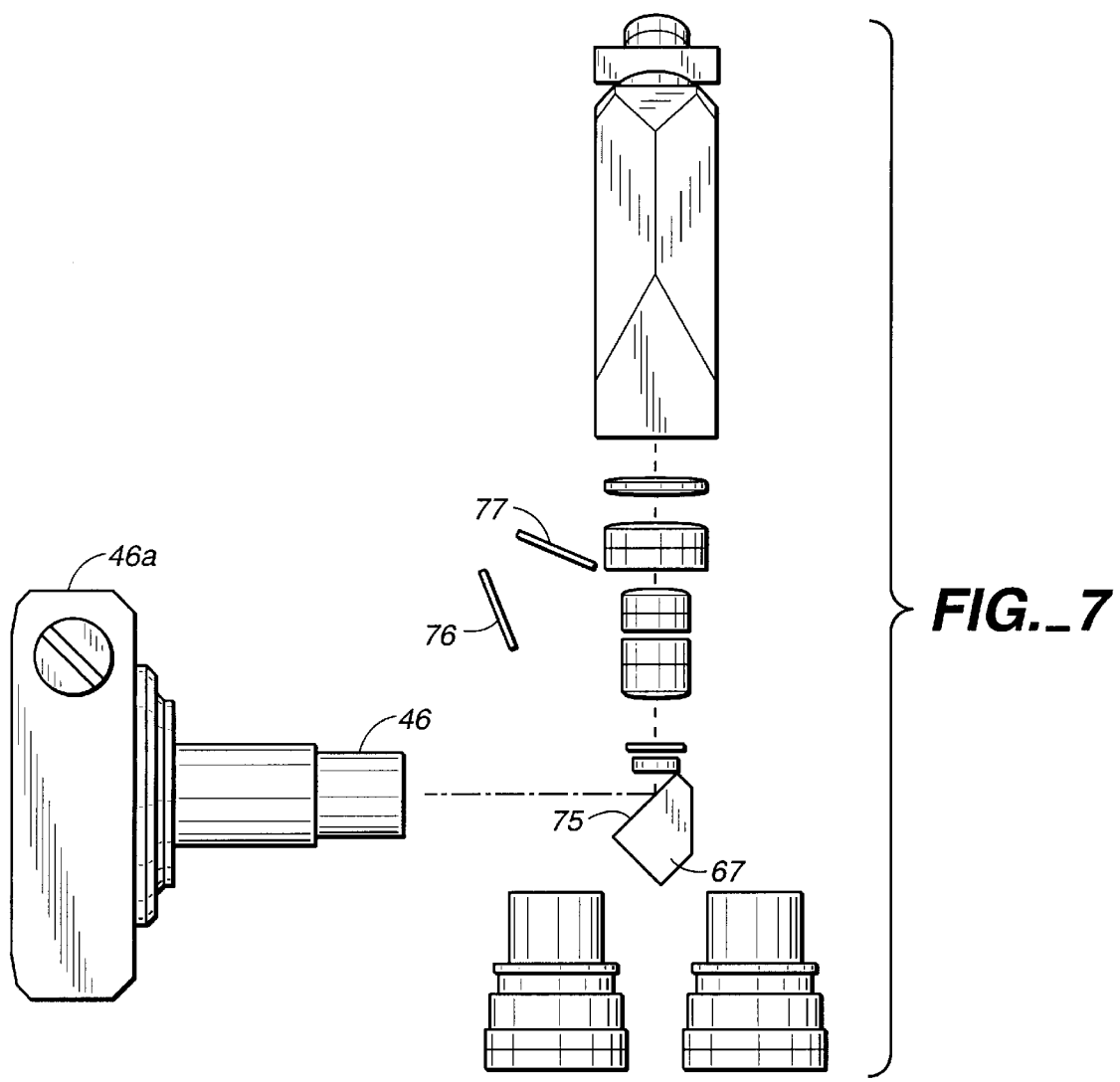
FIG._7

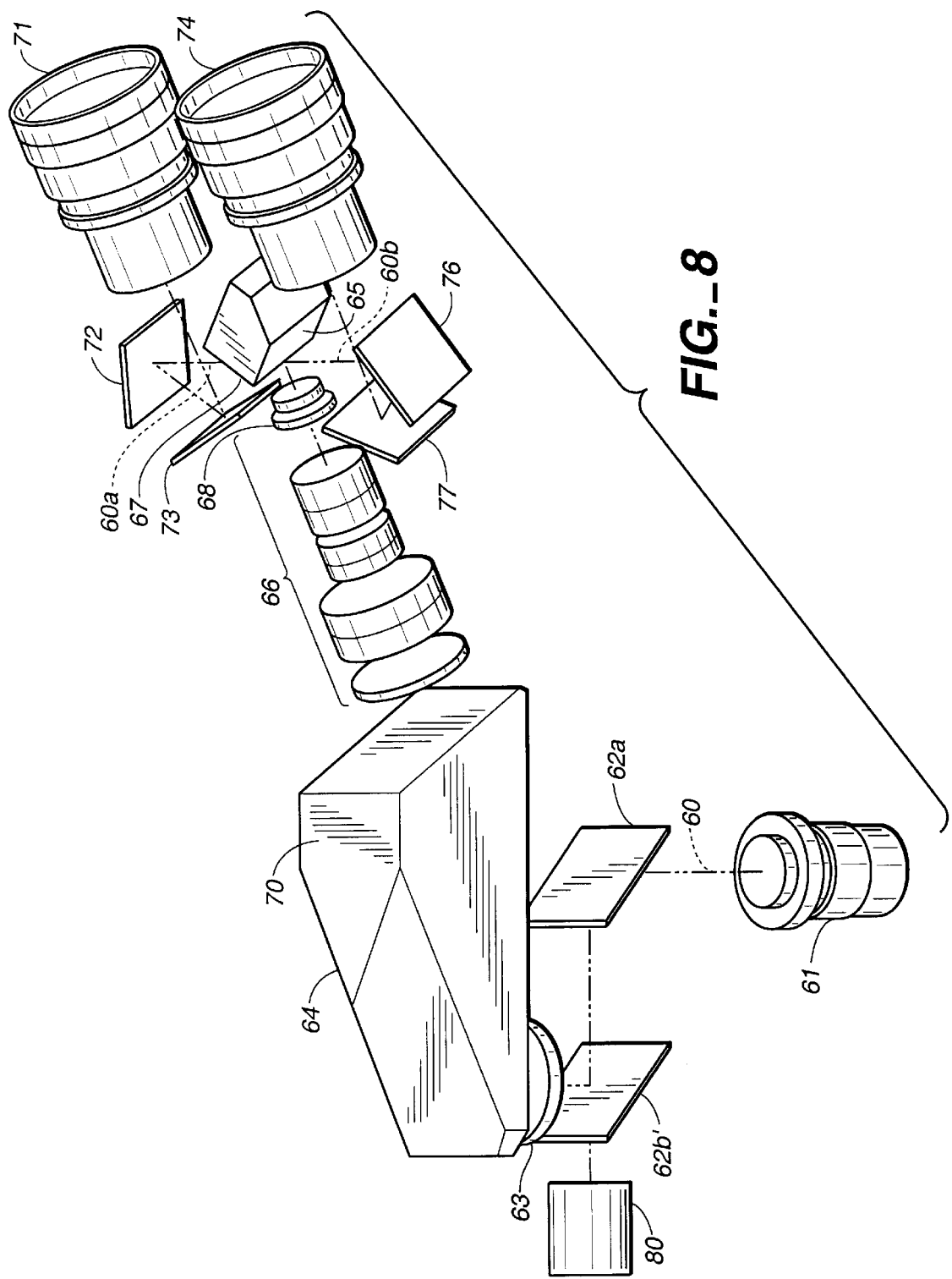
FIG._8

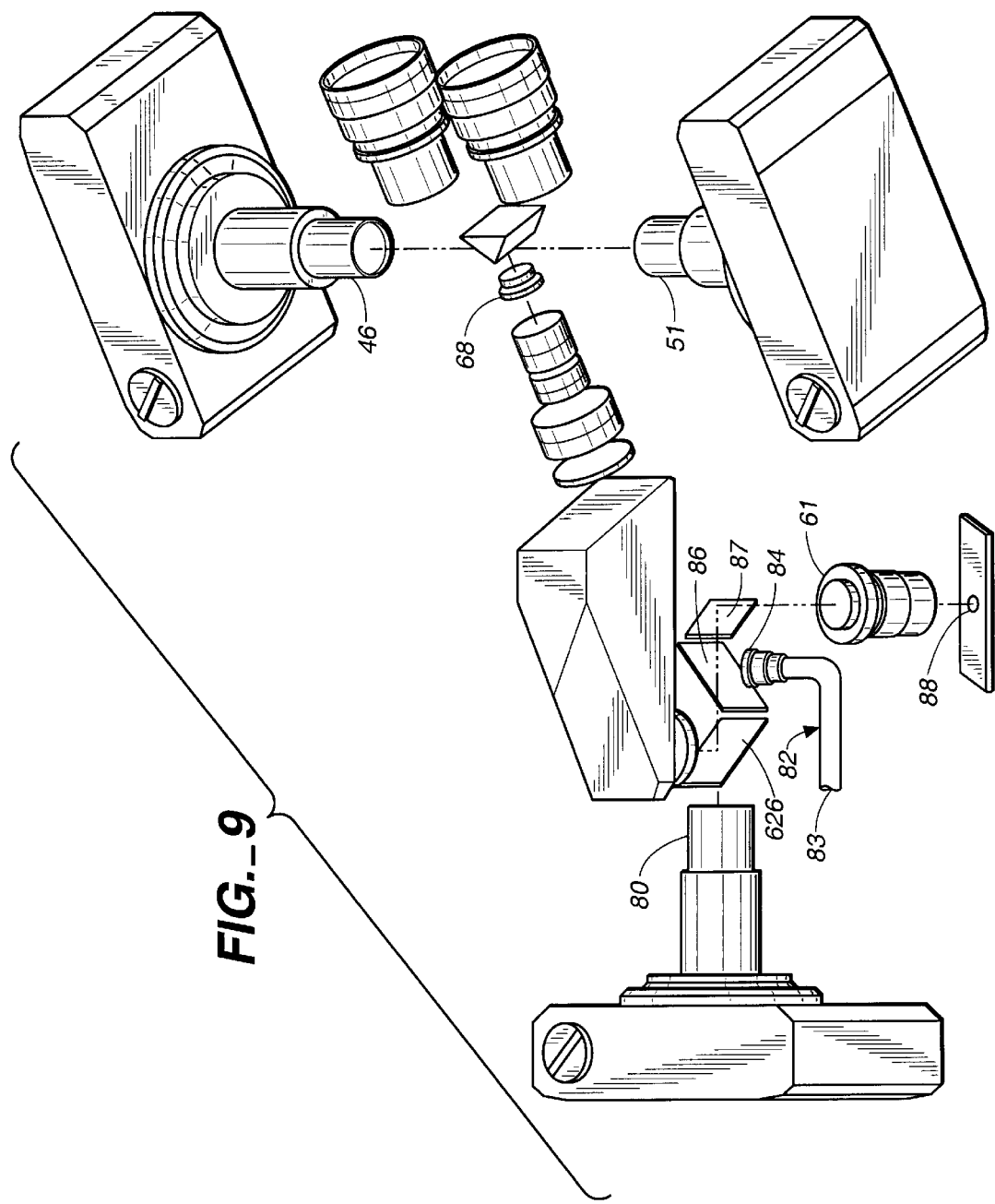
FIG._9

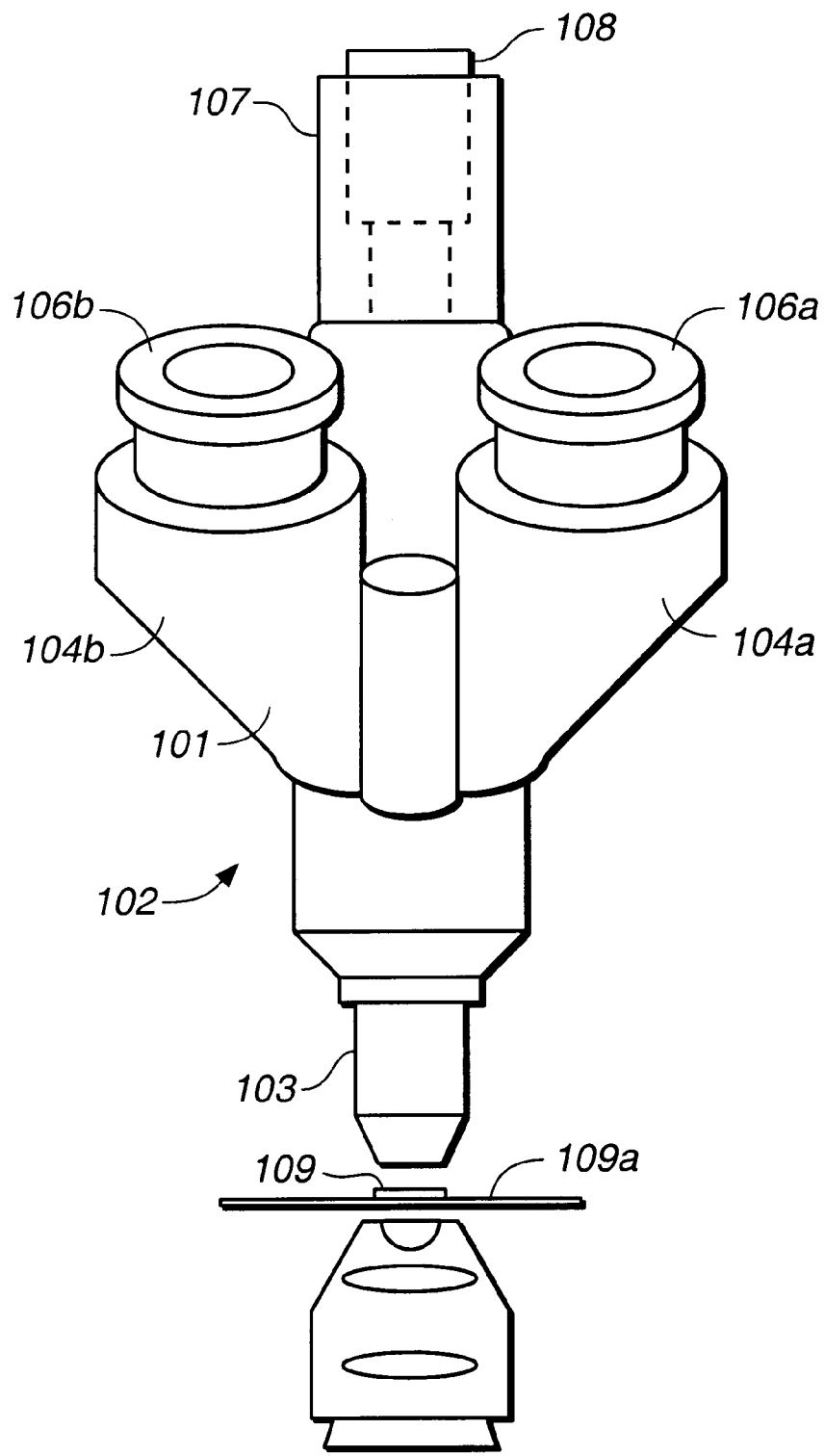
FIG._10
*(PRIOR ART)*

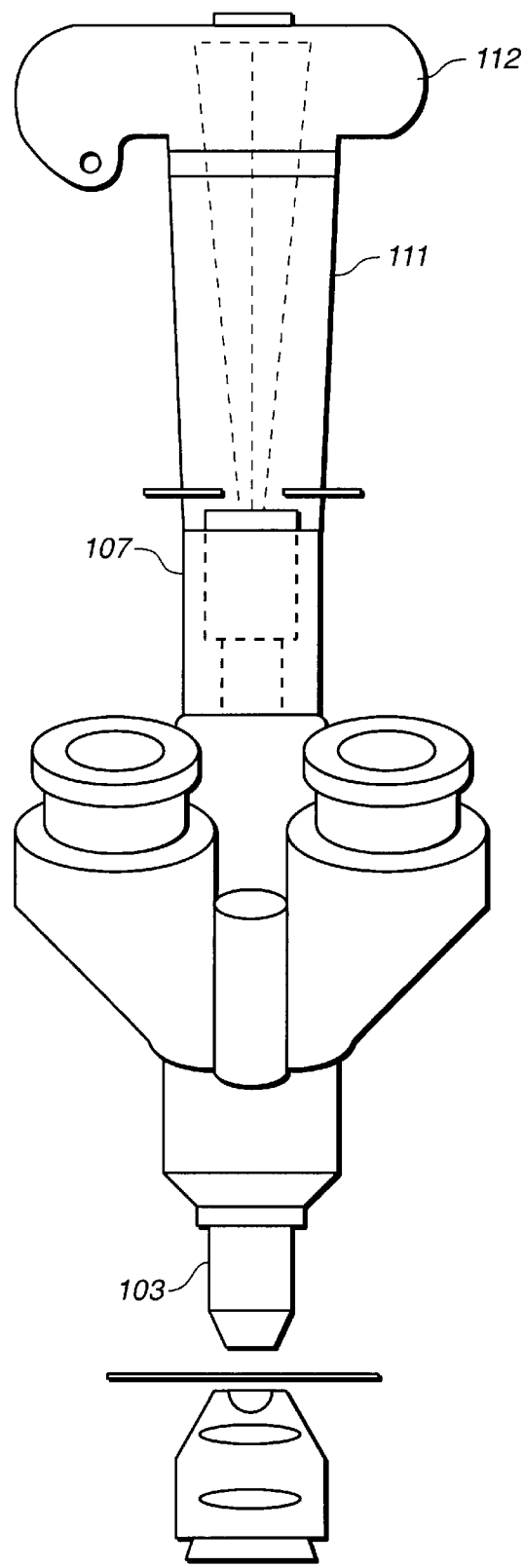
FIG._10A
*(PRIOR ART)*

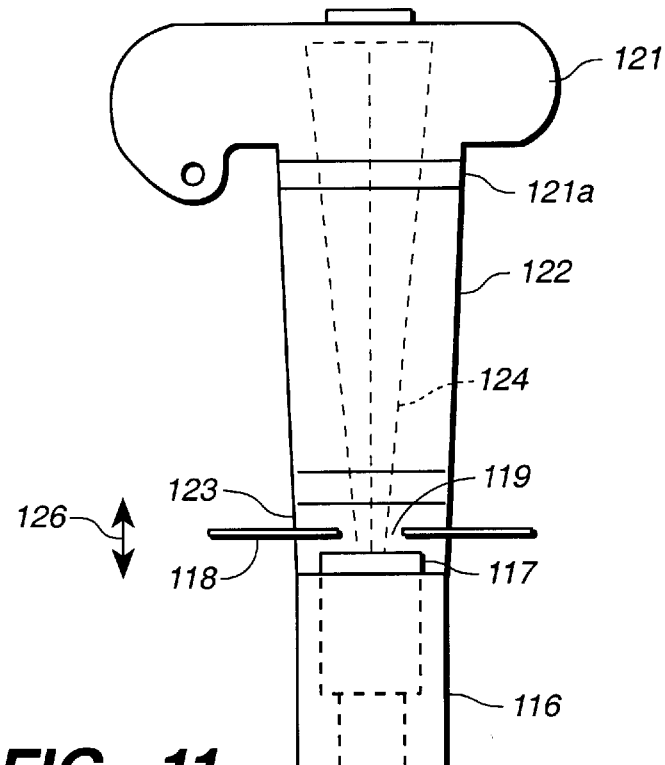
FIG._11
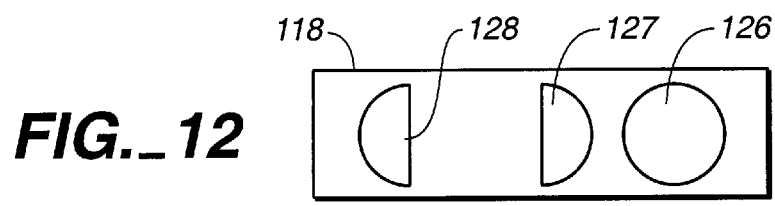
FIG._12
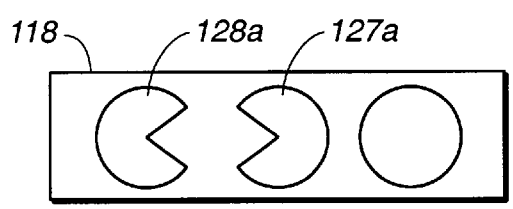
FIG._12A
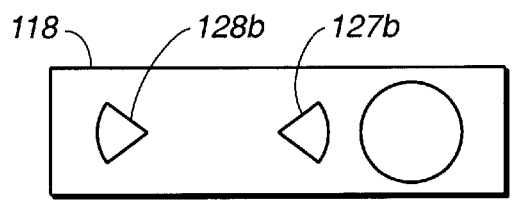
FIG._12B

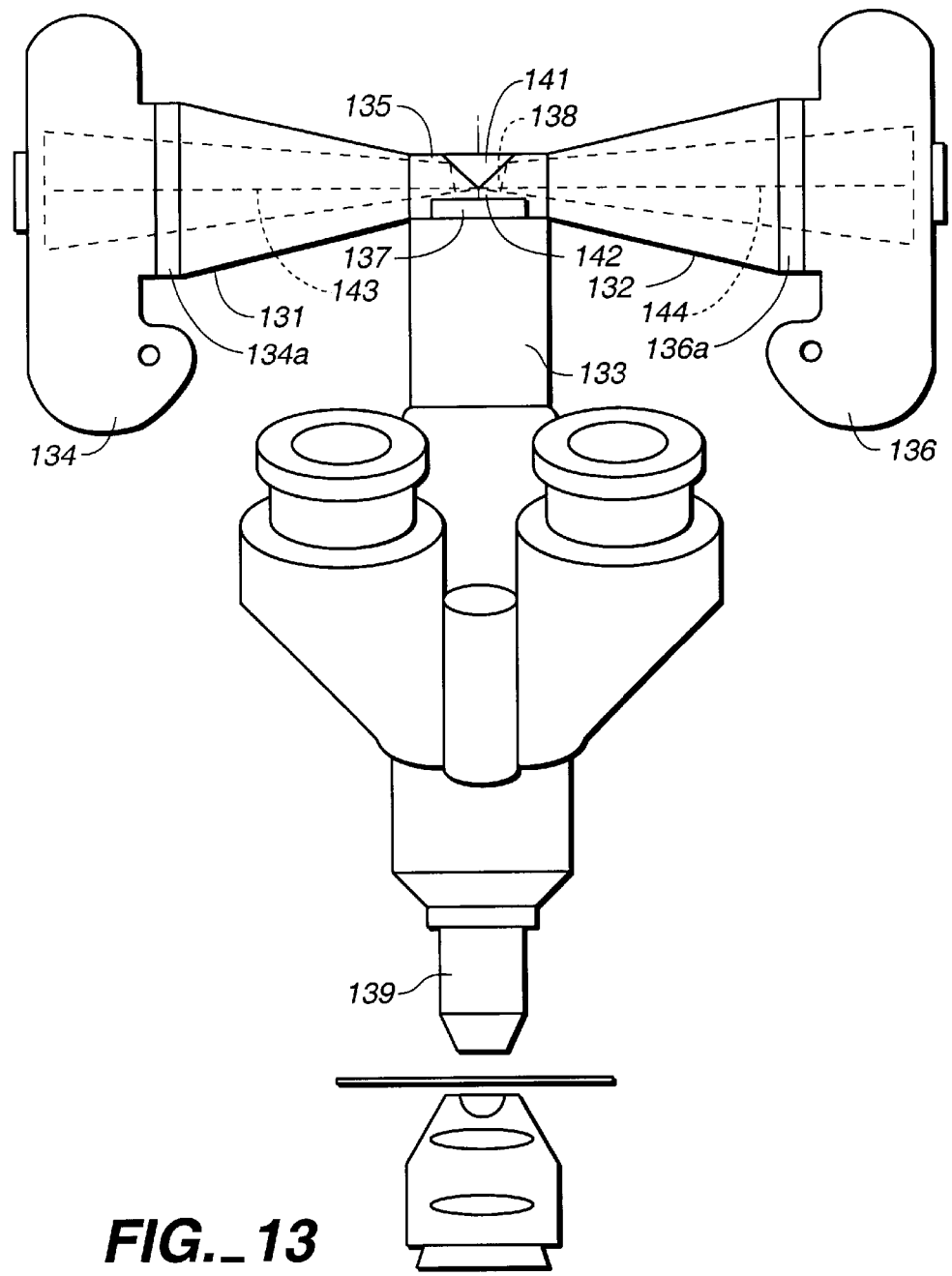
FIG._13
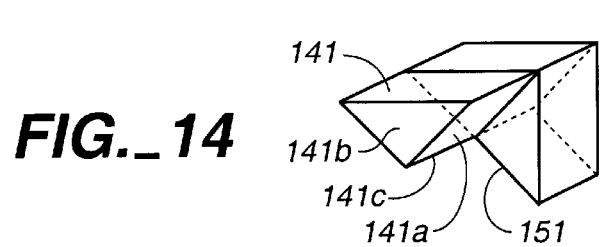
FIG._14

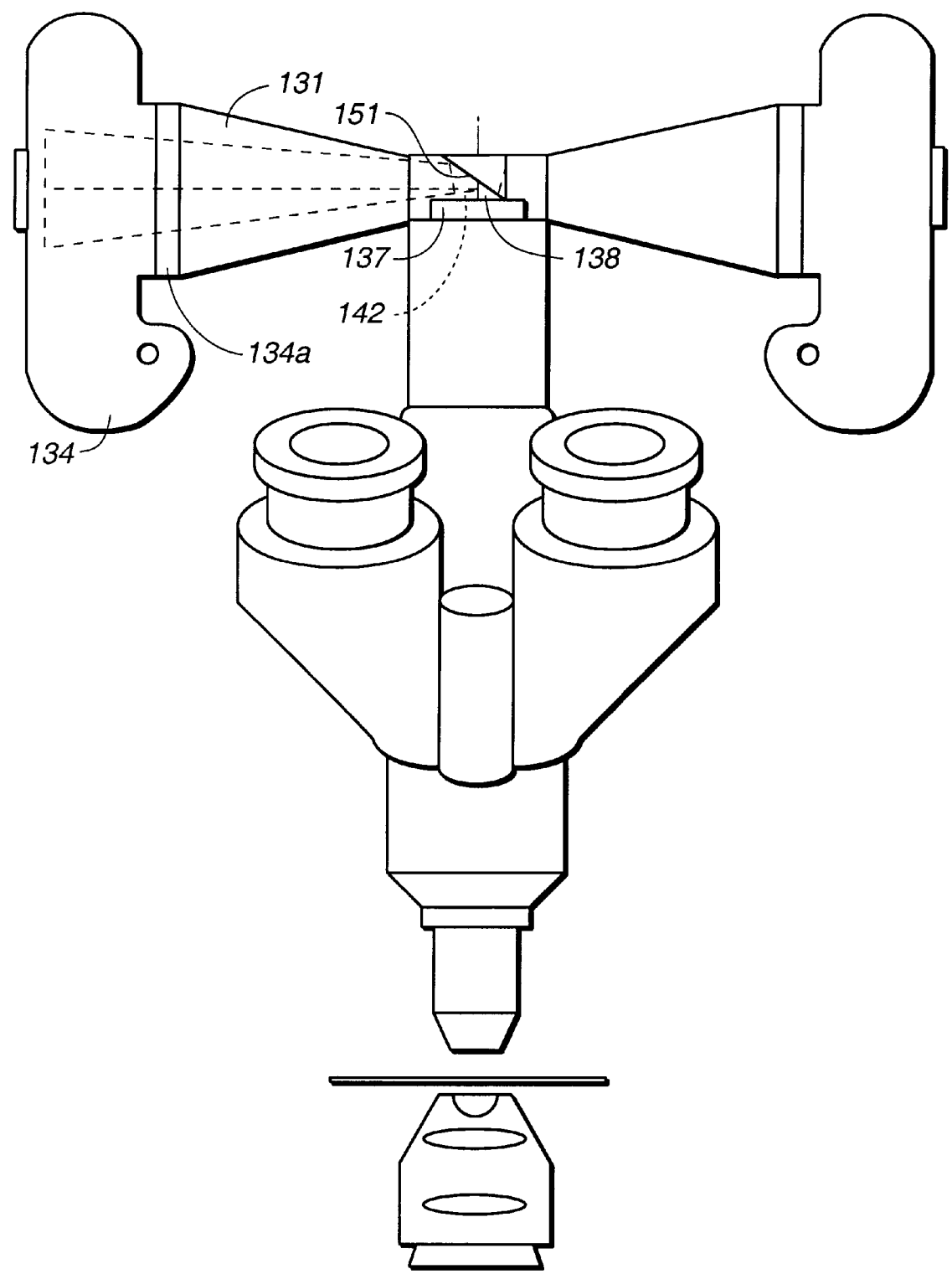
FIG._15

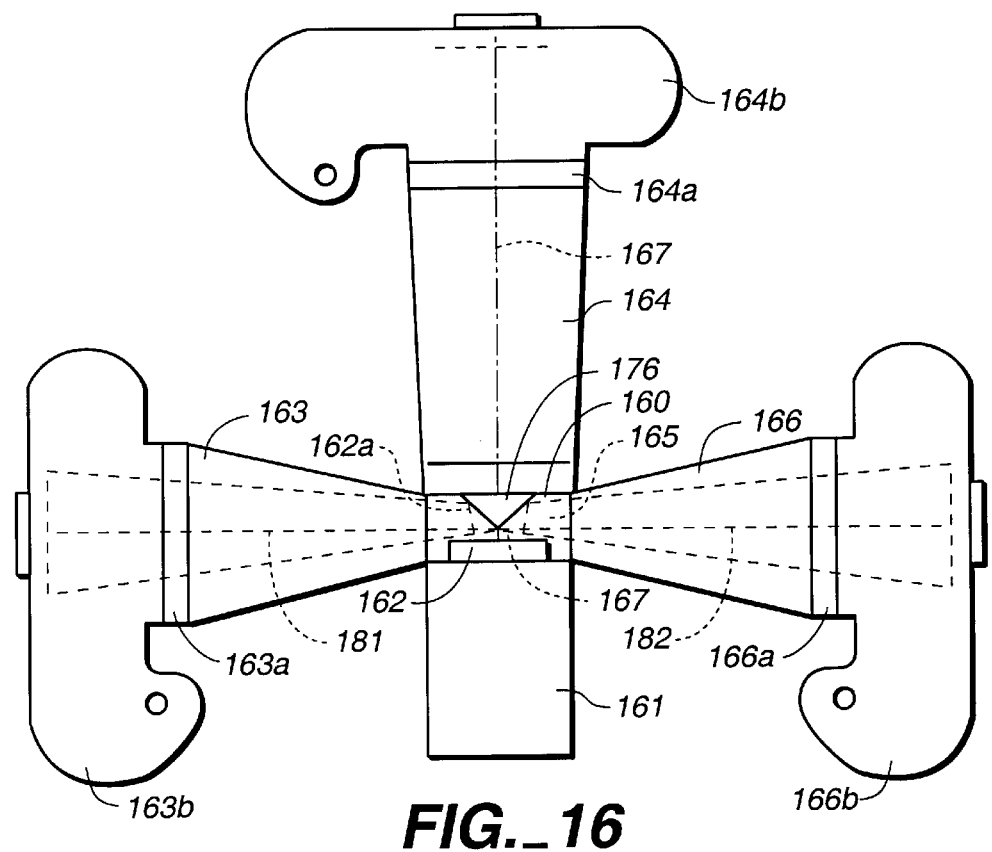
FIG._16
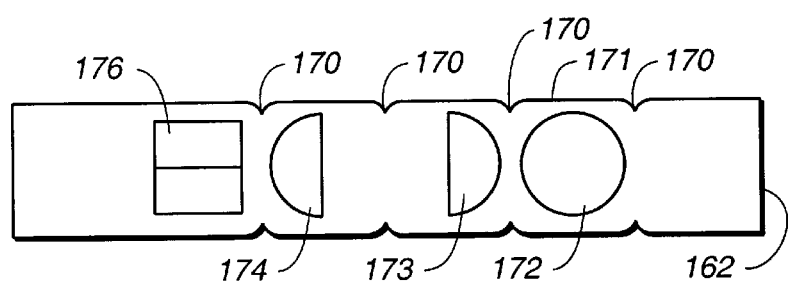
FIG._17A
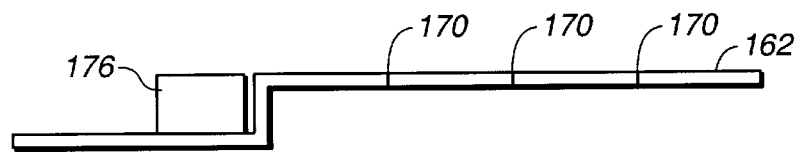
FIG._17B

3-D PHOTO ATTACHMENT FOR A 2-D LIGHT MICROSCOPE

This is a continuation-in-part of our application Ser. No. 08/630,542, filed Apr. 10, 1996, for IMPROVEMENTS IN MICROSCOPE ILLUMINATION AND VIEWING, which is a divisional application of application Ser. No. 163,924, filed Dec. 8, 1993, now U.S. Pat. No. 5,539,572, issued Jul. 23, 1996, which is a continuation-in part of application Ser. No. 143,484, filed Oct. 26, 1993, abandoned, which is a continuation-in-part of Ser. No. 957,286, filed Oct. 6, 1992, abandoned.

BACKGROUND OF THE INVENTION

1. Field of the Invention

The present invention relates to light microscopes, including light microscopes of the kind having a trinocular head with a phototube for photographing microscope images, and in particular, to taking stereo photographs for 3-D viewing.

2. The Prior Art

Although many microscopes are equipped with a binocular viewing arrangement, that alone does not produce a stereoscopic view of an object, since both of the viewing eyepieces typically see the exact same image from the same angle. Stereoscopic viewing requires that each eye see a different image of the object. This is accomplished by creating parallax (viewing the object from different angles) in much the same way that human eye pairs create stereoscopic vision. Stereoscopic photography likewise requires that two cameras record the same image from different angles.

At the present time, there are two types of stereoscopic microscopes widely known and used. The first of these (inclined axes type) is, in essence, two complete microscopes with their objectives close together and their major axes inclined to each other to permit object viewing from two different angles to create the parallax necessary for producing a stereo pair. An example of this type of microscope is the Nikon® model SMZ-2B/2T.

The other type of stereo microscope (parallel-axis type) utilizes a single large objective lens followed by two smaller side-by-side lens groups whose axes are parallel to the objective lens axis and which share the aperture of the large objective. In this arrangement, only a small portion of the aperture of the large objective lens is used. An example of this type of microscope is the Nikon® model SMZ-10.

Both of these types of stereo microscopes have the well recognized limitation in the magnification that can be achieved. This limitation, that prevents total magnification of more than 100 times (approximately), is imposed by the practicalities of size and space. As magnification increases, the size of the objective (and its focal length and working distance) decreases. In the case of the inclined type of microscope, there is insufficient space for two objective lenses when the objective magnification exceeds approximately 10 times (the centers of the lenses need to be closer together than their physical size—radii- permits). Likewise, for the parallel-axis microscope, it is not possible to physically dispose two side-by-side secondary lenses behind the primary objective when the objective is diminished beyond a certain size (i.e. as the objective magnification increases beyond 10 times—approximately).

SUMMARY OF THE INVENTION

The present invention provides improvements in microscope image recording capabilities in which a camera views the object from a different angle through a single objective, regardless of the size of the objective, and therefore, regardless of the overall magnification of the microscope. The invention permits the simultaneous viewing and photographing of stereo images and convenient means for photographing images in two dimensions for the highest possible resolution.

The objects of the invention are achieved by projecting an image of the rear aperture of the microscope objective lens at a remote location in space (relative to the actual rear aperture) and dividing the beam at the projected image and/or placing an iris at the projected image to control flare.

For stereo viewing or recording, reflector means operate very near the rear aperture of the objective lens to divide the light into two separate beams and direct those beams to the two separate viewing means (eyepieces and/or cameras) of the binocular viewing system. A reflector means in the form of a "V"-shaped mirror reflects the light from one half of the objective (via other reflector means) to one of the viewing means, while the other half of the light is reflected to the other viewing means. In this way, each viewing means receives the light from one half of the objective rear aperture and therefore views the object from a different angle, producing true stereoscopic viewing in real-time, with real color, using either transmitted light, reflected light or fluorescence light.

Because limitations of size and space for high power microscopes make it impossible or impractical to place a mirror at the rear aperture of the objective lens where the beam is most advantageously divided, lenses are used to relay an image of the rear aperture of the objective at a location in space where the mirror can be practically located. The beam is then divided at this location in space precisely as it would be if the mirror were physically located adjacent the objective's rear aperture. In a trinocular head, an image of the rear aperture of the objective is typically projected into the photo eyepiece for 2-D photography.

The particular lenses used to produce the remote imaging of the objective rear aperture depend on whether the objective is of the "infinity focus" type or the "finite focus" type, as well as on all the other parameters of the particular optical system. In either case, the result is the same.

An object of the present invention is to provide a high power microscope stereoscopic viewing head which can readily produce 3-D stereo pair photographs simultaneously or sequentially, as well as high resolution two-dimensional photographs.

Another object of the present invention is to provide improvements in trinocular head viewing systems whereby phototubes, normally useful for taking 2-D photographs only, are transformed to be useful in taking 3-D photographs (stereo pairs).

There are other objects of the invention which, in part, are obvious and, in part, will become apparent from the description of the invention set forth herein below.

BRIEF DESCRIPTION OF THE DRAWINGS

FIG. 1 is a schematic illustration of a binocular optical system for stereoscopic viewing incorporating one embodiment of the present invention;

FIG. 2 is an isometric view of the beam-dividing mirror of FIG. 1;

FIG. 3 is a schematic drawing of a binocular optical system for stereoscopic viewing incorporating another embodiment of the present invention in which the rear aperture of the objective lens is imaged in space;

FIG. 4 is a perspective view of an embodiment of the invention including image spacial orientation optics.

FIG. 5 is an overhead view of the embodiment of FIG. 4 showing the head of the present invention with cameras positioned to receive part of the image beams;

FIG. 6 is the same as FIG. 5 with the polyhedron reflector rotated to a second position and the eyepiece reflecting mirrors positioned out of the beams' paths;

FIG. 7 is the same as FIG. 6 with the polyhedron reflector rotated to a new position wherein all of the beam is reflected into one camera;

FIG. 8 is an alternative embodiment to that shown in FIG. 4 with the addition of means for two dimensional photo recording through a minimum of glass;

FIG. 9 is a perspective view of an embodiment of the invention including epi illumination and flare control;

FIG. 10(a) is a schematic, semi-perspective view of a microscope representational of the prior art with a trinocular head having a binocular viewing system and a phototube and eyepiece for taking photographs;

FIG. 10(b) is FIG. 10(a) with a camera shown mounted onto the phototube;

FIG. 11 is a schematic view of one embodiment of the invention as applied to the phototube of the microscope of FIG. 10;

FIG. 12 is a plan view of the screen carrier of the embodiment of FIG. 11;

FIG. 13 is FIG. 10 with another embodiment of the invention shown configured for 3-D photography;

FIG. 14 is a perspective view of the sliding beam splitter-reflector of FIG. 13;

FIG. 15 is FIG. 13 with the invention shown configured for 2-D photography;

FIG. 16 is a schematic view of yet another embodiment of the invention in which simultaneous 3-D, sequential 3-D and conventional 2-D photography is possible by the adjustment of a single slide mechanism;

FIG. 17(a) is a plan view of the slider of the embodiment of FIG. 16; and

FIG. 17(b) is a side view of FIG. 17(a).

DETAILED DESCRIPTION OF THE INVENTION

Referring to FIG. 1, a microscope objective 11 (typically composed of a plurality of lens elements) receives a light beam 10 from an illuminated object 12 located at a specimen plane 13. A V-shaped mirror beam dividing means 17 divides the beam 10 into two separate beams, 10a and 10b. The separate beam 10a follows a path to a left eyepiece mirror 18 and left eyepiece 14 of binocular viewing system 15. The other separate beam 10b follows a path to a right eyepiece mirror 19 and a right eyepiece 16 of binocular viewing system 15. An image 12' of the object 12 is created at the focal plane 20 of eyepiece 14 and focal plane 25 of eyepiece 16.

The V-shaped mirror 17 is formed by a left panel 21 having a reflective surface 22, and a right panel 23 having a reflective surface 24, joined together at a right angle along a mirror edge line 26. The mirror 17 can take any one of several forms, including that resulting from silvering the two faces of a prism (see FIG. 4). The essential elements of the mirror 17 for the purposes of the present invention are two reflecting surfaces at approximately right angles positioned at approximately 45 degrees to the optical axis OA of objective lens 11. By placing the mirror 17 in close proximity to, and with its edge line 26 generally bisecting the rear aperture 27 of objective 11 (edge 26 falling along a diameter of the rear aperture), half of the light passing through the rear aperture 27 of objective lens 11 will be reflected to the left eyepiece 14 by way of left eyepiece mirror 18, and the other to right eyepiece 16 by way of right eyepiece mirror 19.

By virtue of this arrangement of components, the left eyepiece views the object 12 from the angle of the left half of the objective lens 11, while the right eyepiece views the object from the angle of the right half of the objective lens, thereby giving rise to a stereoscopic view of the object through the binocular viewing system 15.

In order for the mirror 17 to capture a full field of view and provide well-separated left and right images, the mirror 17 needs to be disposed in very close proximity to the rear aperture of objective lens 11, as shown in FIG. 1. If the lens 11 and the V-shaped mirror 17 are too close, however, some of the reflected light from mirror 17 will be blocked from the eyepiece mirrors 18 and 19 by the lens 11. Thus, the lens 11 and mirror 17 should be as close as possible to the rear aperture of the objective without causing loss of field by the lens itself.

While it is practical in the case of low-power microscopes to locate the mirror 17 in close proximity to the rear aperture of the objective lens, it is impractical, if not impossible, in the case of high-power microscopes where the objective lenses are very small and typically mounted so as to make their rear apertures physically inaccessible. High-power microscopes typically include a turret mount having a plurality of lens receiving stations where lenses of various magnifications can be attached so that during examination of an object, several different levels of magnification are readily selectable. To accommodate this arrangement, objective lenses for high-power microscopes are typically imbedded within a lens holder designed to be compatible with the turret mount for easy attachment to and detachment therefrom. In these circumstances, the rear aperture of the objective lenses are even less accessible and it is, thus, impossible to dispose a mirror (such as V-shaped mirror 17) at sufficiently close proximity to the rear aperture to realize the full advantages of the present invention.

Referring to FIG. 3, an illuminated object 32 (at a specimen plane 33) transmits light 30 to the front element 40 of an objective lens 31. This light is ultimately directed to a left eyepiece 34 and a right eyepiece 36 of a binocular viewing system 35 as described above in connection with the embodiment of FIG. 1. Because the rear aperture 37 of objective lens 31 is physically inaccessible, a V-shaped mirror 38 having reflective surfaces 38a and 38b with the same characteristics as described in connection with mirror 17 reflective surfaces 22 and 24 (FIGS. 1 and 2) for splitting the light from the objective into left and right components is, of necessity, disposed at a location remote from the rear aperture 37.

In order for mirror 38 to effectively divide the light into left and right components, an image 37' of the rear aperture 37 is projected to a location at or very near mirror 38 by a set of relay lenses (indicated generally at) 39. By imaging the rear aperture 37 to a remote location and locating mirror 38 in close proximity thereto, the division of the light from the rear aperture 37 of the objective lens 31 is accomplished with the same effect as if the mirror 38 were in fact located immediately adjacent the rear aperture 37 itself (as described above in connection with the embodiment of FIGS. 1 and 2). Thus, the mirror 38 directs half of the light from the rear aperture 37 of the objective lens 31 to the left eyepiece 34 by way of left eyepiece mirror 41, and the other half to the right eyepiece 36 by way of right eyepiece mirror 42. When the V-shaped mirror is placed at the projected image of the objective rear aperture (rather than at the rear aperture itself as in the embodiment of FIG. 1), there is no lens element in such close proximity as to occlude any of the reflected light and, thus, the V-shaped mirror can be placed virtually at the rear aperture.

The best results are achieved by placing the V-shaped mirror 38 as near to the image 37' as possible. As the distance between the mirror 17 and the rear aperture 27 (FIG. 1) or mirror 38 and the image 37' of the rear aperture 37 (FIG. 3) increases, the parallax decreases until, at some distance, the two mirrors of the V-shaped mirror 38 see the same image (from the same angle) and the stereoscopic effect is lost (and a portion of the field of view is lost). Thus, in the present invention, the dividing V-shaped mirror (17 in FIG. 1 and 38 in FIG. 3) must be within that range of the objective rear aperture or its projected image that produces different images at the two reflective surfaces (22 and 24 of FIG. 1 and 38a and 38b of FIG. 3) of the dividing mirror and thereby produces a stereoscopic effect.

While the beam dividing and directing means described above has been shown as a V-shaped mirror, one or more prisms could also be used for that purpose.

The embodiment of the present invention wherein an image of the rear aperture is projected to a remote location (FIG. 3) permits an iris 45 to be located near the image 37' of the rear aperture 37 of the objective in order to control flare and scattering of light, and to improve contrast and depth of field, as well. The advantages accruing to locating the iris out of the specimen illumination path (where it is found in the prior art) are described in detail below in connection with FIG. 9.

The various arrangements and specifications of lenses 39 used to create an image 37' of the rear aperture 37 of the objective lens 31 at a remote location in space (where the mirror 38 and iris 45 can be physically disposed in close proximity thereto) are well known to those skilled in the art of microscope optics and, as such, do not themselves form a part of the invention. For a given objective lens the arrangements are numerous and the optical design can vary considerably.

High power light microscopes popularly in use at the present time employ one of two types of objective lens. One type of lens, produces a beam that is focused at infinity (basically parallel) to permit the distance between the eyepieces and the objective to be varied when necessary to accommodate other equipment. The other type of lens produces a beam which is focused at a finite distance, thereby fixing the distance between the objective lens and the eyepieces of the binocular viewing system. It might appear, in the case of the infinity focus lens, that it would be possible to place a mirror, such as mirror 38, at a remote location from the rear aperture of the objective lens and still obtain a full field of view. In practice, however, although the beam from the objective is focused at infinity, the beam envelope diverges. Thus, at a distance from the objective lens where a mirror, such as mirror 38, could be located, the divergence of the beam would cause a significant part of the field of view to be lost and the parallax between right and left images would be greatly reduced. Thus, whether a microscope is one employing a finite focus objective lens or an infinity focus objective lens, it is necessary to create a remote image of the rear aperture of the objective lens adjacent to the dividing mirror 38. It may be necessary to interpose between the rear aperture 37 and the lenses 39 optics, such as a roof prism, for reversing the image so that the image that is viewed at the binocular eyepieces has the same orientation in space as the object being examined.

Referring to FIG. 4, light beam 60 passing through an objective lens 61 is folded by mirrors 62a and 62b (to reduce the size of the head) and directed through a field lens 63 to a roof prism 64 which established the correct background-foreground orientation to the viewer by directing the left eye view to the left eyepiece 74 and the right eye view to the right eyepiece 71. A deviation prism 70 (which can be separate from or integral with roof prism 64—in this embodiment, it is shown integral with the roof prism 64) orients the axis of the light beam 60 at an angle comfortable to a viewer. The light beam 60 then passes through a series of lenses 66 that act as a relay system to image the rear aperture of the objective lens 61 in close proximity to the edge of V-shaped planes 65 (only one of which is shown) of a polyhedron dividing mirror 67. An iris 68 is disposed in the light path between the lenses 66 and the mirror 67 in order to reduce flare.

A first separate beam 60a of the divided beam is reflected into an eyepiece 71 by beam deflection means mirrors 72 and 73 (72 may be partially silvered to permit transmission as well as reflection), while the other part 60b of the divided beam is reflected into eyepiece 74 by beam deflection means mirrors 76 and 77 (76 may be partially silvered to permit transmission as well as reflection). The use of a two mirror reflection means to reflect the beam into an eyepiece, as opposed to a single mirror (as in the embodiments of FIGS. 1 and 3), adds an additional reflection which reverses the image, giving it correct left-right orientation to the viewer.

The roof prism 64 operates on the beam not only to bend it to a more user-friendly angle, but also to orient the image so that the background-foreground orientation is the same to the observer as the actual specimen being observed. However, in doing so, prism 64 also reverses the left-right orientation of the specimen, thus requiring mirrors 72 and 76.

Other arrangements of mirrors and prisms, some well known in the art, can be employed in the system of the present invention to orient the image to the observer to correspond to the orientation of the specimen relative to the observer.

In addition to an observer viewing the stereoscopic image through eyepieces, the present invention affords the ability to create high-power simultaneous stereo pair photographs.

Referring to FIGS. 5, 6, and 7, a first photographic camera port 46 is located in the path of the light beam that passes through the partially silvered mirror 76, while a second photographic camera port 51 is located in the path of the light beam that passes through the partially silvered mirror 72. Photographic cameras 46a and 51a are attached to the camera ports 46 and 51, respectively.

When it is not necessary to provide an image of the object to the eyepieces, the mirrors 72, 73, 76, and 77 can be selectively positioned out of the paths of the beam 60a and 60b (see FIG. 6) to permit the reflecting surfaces 65 of the polyhedron dividing means mirror 67 to reflect beams directly into the cameras ports 46 and 51 so as to increase the light available to the cameras 46a and 51a.

Because the present invention permits stereo photos to be taken of the right image and the left image simultaneously, the present invention provides, for the first time, a stereoscopic microscope viewing system capable of taking high-power stereo pair photographs of objects (such as living organisms) whose images are in constant flux.

For two-dimensional, high-resolution photography using a single camera, the present invention provides the polyhedron dividing mirror 67 with an integral 45 degree reflective surface 70 which, when rotated into the path of the light beam 60 (see FIG. 7), directs the light beam 60 directly into camera 46a. The mirrors 76 and 72 remain out of the beam path.

Referring to FIG. 8, an alternative embodiment of the invention provides a mirror 62b' which is partially silvered (e.g. 80/20) to permit most of the light (80%, for example) to pass directly through to a camera port 80, with the rest of the light (20%) reflecting from mirror 62b' and then passing through to the viewing eyepieces 71 and 74 as previously described with reference to FIG. 4. The advantage of this embodiment is that the light beam 60 enters the camera port 80 directly and before it passed s through the multiple lens and prism system necessary to produce correctly spatially oriented stereo images to a viewer. The port 80 thus sees an image whose quality is undiminished. Where viewing of the image is no longer necessary, the mirror 62b' can be selectively positioned out of the path of light beam 60 to permit the entire beam 60 to enter the camera port 80.

Thus, the present invention teaches a system whereby an object can be viewed under high-power magnification in 3-D with high resolution, and simultaneous 3-D stereo pair photos can be taken, either while still viewing the object, or after the viewing means has been disabled to enable all of the available light to be directed to the photography recording apparatus. Two-dimensional high-power, high-resolution photographs can also be taken while viewing the object in 3-D.

Referring to FIG. 9, a reflection light source 82 (shown by way of example only as an epi illumination light source 82) includes a fiber optic bundle 83 with a lens 84 for focusing purposes—other known forms of reflected light, including side lighting, can be used as well. The light from source 82 is directed onto, and reflected by, a beam splitter (such as a half silvered mirror) 86 and a mirror 87, and then through the objective 61 to a specimen 88. The light reflected by the specimen passes through the objective 61 onto the mirror 87 and through the half silvered mirror 86 to mirror 62b and into the optical system described with reference to the other Figures. The benefits to a reflection illumination microscope of the combination of the projected image of the rear aperture of the objective lens and an iris in close proximity to that projected image are enjoyed by two-dimensional viewing systems, as well as by the 3-D system of the present invention. Since the light from the source 82 is not constricted by an iris as it passes to and from the specimen 88, essentially all of the available illumination from the light source 82 reaches and illuminates the specimen 88 and the full numerical aperture of illumination is operative.

The iris 68, previously described, is optically disposed near the projected image 37' (see FIGS. 3 and 8) of the rear aperture of the objective in a portion of the reflection path of the beam 60 which is not coincident with any part of the illumination path of the beam 60 from the light source to the specimen. In order to avoid a reduction in the field of view and maintain uniform lighting over the entire field of view, the iris is preferably within that near proximity of the projected image of the rear aperture where the iris is not seen by the viewing means (human observer, camera, etc.). The iris, so located, has the same effect as an iris within the rear aperture of the objective; it limits the flare before the image-carrying beam 60 reaches either the eyepieces 71 and 74 or the camera ports 46 and 51. Because the iris of the present invention is not in the illumination path, however, it does not restrict the light from the light source 82 to the specimen 88. In this way, flare is effectively controlled without reducing the light available to light a specimen, including the elusive specimens that the advent of fluorescent illumination has made possible to record and see.

The present invention can further be embodied in a standard 2-D microscope trinocular head phototube to enable such a microscope to take stereo pair 3-D photographs of specimens being observed by the microscope.

Referring to FIG. 10, a typical trinocular head 101 for a microscope 102 (of the kind having an objective lens 103) includes a pair of binocular eyepiece tubes 104a and 104b which receive binocular eyepieces 106a and 106b, respectively, as is well known in the art. In addition, the head 101 includes a phototube 107 which can receive a phototube eyepiece 108. The eyepieces 106a and 106b and phototube eyepiece 108 create an image of the rear aperture of the objective lens 103 (sometimes referred to as the "pupil" or "eye-point"), as well as an image of the specimen, which, in the case of eyepieces 106a and 106b, permit a viewer to observe the image of a specimen 109 at a specimen plane 109a, and in the case of the phototube eyepiece 108, permits an image of the specimen 109 to be photographed (either as a still photo or a video).

Referring to FIG. 10A, a camera adapter 111 mounted onto phototube 107 permits a camera 112 to be positioned to capture the image being observed by the objective 103 to be recorded. The camera 112 is shown schematically as a 35 mm still camera, but it will be recognized by those skilled in the art that video cameras, motion picture cameras and digital cameras can also be mounted onto camera adapter 111 to capture an image of the specimen.

The arrangements shown and described with reference to FIGS. 10 and 10A are well known in the art and microscopes having a trinocular head of such general arrangement are currently available from Nikon, Inc. in its Labophot-2A model and from Carl Zeiss in its Axioplan model.

The Zeiss Axioplan differs from the arrangement shown and described in connection with FIGS. 10 and 10A in that the phototube of the Carl Zeiss Axioplan microscope does not include a phototube eyepiece, as the necessary eyepiece to create a pupil is built into the Carl Zeiss camera which fits onto the phototube. Where a phototube eyepiece is not part of the phototube, it can be supplied as part of the present invention.

Trinocular heads, as are presently known in the art and exemplified by the Nikon Labophot-2A and the Carl Zeiss Axioplan, are designed for and capable only of recording 2-D images through the phototube 107.

Referring to FIGS. 11 and 12, one embodiment of the present invention is an add-on to a trinocular head phototube 116 containing a phototube eyepiece 117, which creates a pupil 119. The invention resides in the combination with the phototube and eyepiece of a screen carrier 118 located at the eyepiece pupil 119. The screen carrier 118 is interposed between the eyepiece 117 and a camera 121 mounted on a camera adapter 122 at camera port 121a. The camera adapter 122 is mounted on or can be integral with a screen carrier adapter 123 that attaches to phototube 116 in any conventional manner.

In its most basic form, the screen carrier 118 carries three through-screens 126, 127 and 128, which, when used as described below, enable the camera 121 to record stereo pair photographs, as well as 2-D photographs. As used throughout, the term "screen" means any transmissive opening in the otherwise opaque screen carrier 118, including "through-screens" which are apertures in the opaque screen carrier 18 having a defined geometry but no material within its boundaries (other than air). In some applications, the screens may include filters, such as polarizing filters or chromatic filters, and these, by definition, would not be "through-screens."

The through-screens 127 and 128 are geometrically related by being half-circles which are mirror images of each other and thereby form what is referred to herein as a "partial through-screen pair". They need not be half-circles and need not form the circle of the full through-screen 126 (which screens 127 and 128 happen to do) to perform as required by the present invention. Sectors of a circle, as well as other geometries, may be more advantageous under certain circumstances. By way of example, FIG. 12A illustrates a partial through-screen pair 127a and 127b having more area than a half-circle which produce less parallax but provides more illumination. The partial through-screen pair 127b and 128b shown in FIG. 12B has less area than a half-circle, producing more parallax and greater depth of field and contrast, but with less light. Other geometric shapes with particular advantages will occur to those skilled in the art.

Because the function of the partial through-screens is to provide views of the specimen from different angles (or in terms of the pupil, provide an image of the specimen from different areas of the pupil), 3-D stereo pair photos can be created so long as the partial through-screens form a pair.

The through-screens 126, 127, and 128 can be selectively aligned with the pupil 119 and, thus, in the path of any light beam 124 passing through the phototube 116. Through-screen 126 is a "full" through-screen in that it permits substantially all of a light beam to pass without modification. Screens 127 and 128 are "partial" through-screens in that they permit less than all of a light beam to pass (and preferable only about half), but otherwise do not modify the beam. Carrier 118 is movable relative to phototube 116 (and therefore pupil 119) and has three discrete positions. In its first position, screen 126 is aligned with pupil 119, and since through-screen 126 is a full through-screen, substantially all of the light beam 124 passes to the camera 121, through camera port 121a, to record a 2-D image.

In its second position, carrier 118 aligns partial through-screen 127 with pupil 119, in which position approximately one-half of the beam 124 passes into the camera 121, with the other half of the beam blocked by carrier 118.

In its third position, partial through-screen 128 is aligned with pupil 119, and the half of the beam 124, blocked when carrier 118 was in its second position, is permitted to pass to the camera 121.

Taking a photograph with the carrier 118 in its second position and through-screen 127 aligned with pupil 119, and then taking a second photograph with carrier 118 in its third position and through-screen 128 aligned with pupil 119, produces a stereo pair photograph of the image being observed by the objective 103 (see FIGS. 10 and 10A), which photograph can be viewed at a later time in 3-D.

Because a different image is recorded by camera 121 when through-screen 127 is aligned with pupil 119 than when through-screen 128 is aligned with pupil 119, parallax exists between the two photographs, thereby creating a stereo pair photograph which can be seen in 3-D.

In this way, the present invention teaches a relatively simple modification to the phototube of a trinocular head for a light microscope that enables 3-D stereo pair photos to be taken where only 2-D photos were previously possible.

The invention as described above works satisfactorily so long as the carrier 118 is located approximately at the pupil (projected image of the rear aperture of the objective lens) 119. In order to obtain the best possible stereo pair images, carrier 118 can be mounted for adjustment along the axis of light beam 124 (as shown by the double-ended arrow 126) so as to assure that the carrier 118 is at the precise location where no image of the screens 127 or 128 are seen by camera 121.

The embodiment of the invention described above in connection with FIG. 12 is a simple and inexpensive way to enhance a trinocular head phototube to be able to take stereo pair photos where the nature of the specimen being observed permits sequential recording of the image. There are, however, specimens (such as living organisms) which, because of their movement or sensitivity to photo bleaching, are not amenable to being photographed so as to create a stereo pair 3-D photograph by sequential photographs with a single camera, as described above.

Referring to FIGS. 13 and 14, an embodiment of the present invention which permits simultaneous photo recording of a specimen to create 3-D stereo pair photographs includes a pair of camera adapters 131 and 132 mounted onto a phototube 133 by a phototube adapter 135. Cameras 134 and 136 are mounted onto adapters 131 and 132, respectively, and, once again, while these cameras are diagrammatically indicated as being still cameras, they are meant to represent video cameras or other types of cameras, as well.

The phototube 133 carries a phototube eyepiece 137, which creates a pupil 138 (image of the rear aperture of the microscope objective 139) immediately above the eyepiece 137.

A beam splitter 141 located at or very near the pupil 138 operates to divide a beam 142 passing through phototube 133 into a pair of split beams 143 and 144 which are directed into cameras 134 and 136, respectively, through their respective camera ports 134a and 136a. The beam splitter 141 is advantageously a V-shaped mirror having reflective surfaces 141a and 141b joined along a common edge 141c. When beam splitter edge 141c is located relative to the pupil 138 so as to divide the pupil into approximately two equal areas, the image recorded by camera 134 as a result of split beam 143 will be a different view than recorded by camera 136 viewing split beam 144, thus creating the parallax necessary to create a 3-D stereo pair photograph. Because the photographs are created simultaneously, this embodiment of the invention is capable of creating a 3-D stereo pair photograph of living organisms whose movement make it impossible to create such a photograph sequentially or when doing fluorescence microscopy where photo bleaching is an issue.

It is often desirable to have a 2-D photograph as a companion to a stereo pair 3-D photograph, which is accomplished in the above-described embodiment of the present invention by the addition of a mirror 151 to the beam splitter 141 and by mounting the combined beam splitter 141/mirror 151 for movement relative to the phototube 133 (and thus pupil 138) so that in one position, the beam splitter 141 is located in the path of light beam 142 passing through phototube 133, as shown in FIG. 13, and in a second position, the mirror 151 is disposed in the path of the light beam 142, as shown in FIG. 15.

Referring to FIG. 15, when mirror 151 is located at the pupil 138 of eyepiece 137, all of the light from light beam 142 is directed to camera port 134a and camera 134. In this position, all of the available light is used to create a conventional 2-D photograph when so desired.

The embodiment of FIG. 13 of the present invention is particularly useful in connection with creating 3-D video imagery, as is currently well within the skill of the art. By attaching video cameras to camera ports 134a and 136a, the necessary signals can be generated to create 3-D videos that can be viewed in real-time on a video monitor.

While the two-camera embodiment of the present invention, as shown in FIGS. 13 and 15, creates stereo pair photographs and is capable of a 2-D photo mode, there are certain advantages to the sequential mode embodiment of the invention, as shown in FIGS. 11 and 12, in terms of alignment and having the photographed images on the same roll of film. At the same time, it is desirable to be able to take stereo pair photographs of specimens which, by their nature, do not permit sequential recording of the image, which is a limitation of the embodiment of FIGS. 11 and 12.

Referring to FIGS. 16 and 18, a three-camera embodiment of the present invention enables a standard trinocular head microscope to be adapted to take 2-D photographs with an unobstructed light beam, as well as 3-D stereo pair photographs, either simultaneously or sequentially, as desired and as the nature of the specimen permits.

Mounted to a phototube 161 containing an eyepiece 162 which forms a pupil 165 is a phototube adapter 160 to which are mounted three camera adapters 163, 164 and 166 having camera ports 163a, 164a and 166a, respectively. Attached to each of the camera ports 163a, 164a and 166a is a camera 163b, 164b and 166b, respectively, for the recording of an image carried by a light beam 167. Once again, while the cameras 163b, 164b and 166b are diagrammatically indicated as still cameras, the invention is not so limited and they are meant to represent video cameras, as well as other image capturing devices.

Referring to FIGS. 17a and 17b, together with FIG. 16, an opaque screen carrier 171 located substantially at the pupil 165 carries three through-screens 172, 173 and 174 having the same geometry as the previously described screens of carrier 118 of FIG. 12. A 2-D photograph is taken with full through-screen 172 aligned with pupil 165 by an unobstructed beam (not reflected by a mirror or transmitted through a lens), while partial through-screens 173 and 174 are sequentially aligned with pupil 165 to create a stereo pair 3-D photograph. Integrally connected to screen carrier 171 is a beam splitter 176 in the form of a V-shaped mirror 176 which functions as previously described in connection with the V-shaped mirror 141 of FIGS. 13 and 14. The screen carrier 171 and its integrally attached beam splitter 176 is positionable relative to pupil 165 at four discrete positions defined by detents 170. In its first position, for example, full through-screen 172 is aligned with pupil 165 and the light beam 167 passes unobstructed through through-screen 172 to camera 164b for a high quality 2-D photograph.

In a second position, half through-screen 173 is aligned with the pupil 165 and camera 164b records a photograph of the image from one-half of the pupil 165. In a third position, half through-screen 174 is aligned with the pupil 165 and camera 164b records a photograph of the image from the other half of the pupil 165. Together, the photographs create a stereo pair 3-D photograph.

In its fourth position, the beam splitter 176 is located at the pupil 165 and directs split beams 181 and 182 to camera ports 163a and 166a, respectively, for recording the image by cameras 163b and 166b. In this position, a 3-D stereo pair photograph is created simultaneously.

The embodiment of FIG. 16 thus permits a microscope operator to select a desired photographic mode by simply positioning carrier 171 to one of its four discrete positions.

The invention has been illustrated showing only basic geometric relationships for the through-screens (full circles and half-circles and portions of circles), as they adequately illustrate the basics of the invention. Those skilled in the art will recognize, however, that the screen carrier can contain a wide variety of through-screens of different geometric shapes, as well as screens that contain filters and possibly other beam modifying elements. It is also within the skill of the art to stack screen carriers so that a variety of combinations are readily available. Applicant's co-pending U.S. patent application Ser. No. 08/846,412, filed Apr. 30, 1997, which is a continuation of U.S. application Ser. No. 08/526,400, filed Sep. 11, 1995 (now abandoned) describes in greater detail numerous alternative embodiments for screens and screen carriers, some of which are obviously useful in connection with the present invention. The relevant teachings from that application are incorporated by reference herein as if fully set forth.

The present invention resides primarily in the manipulation of a light beam at the pupil of a phototube eyepiece in a trinocular head for a light microscope for the purpose of enabling the taking of 3-D photographs. A wide variety of mechanical devices for the mounting of camera adapters and camera ports to a phototube and for positioning a screen carrier are well within the skill of the art and do not form the essence of Applicant's invention.

One of the possible alternatives to the carrier and through-screen arrangement described above is a light transmissive liquid crystal cell, such as that taught in U.S. Pat. No. 4,561,751 to Kley, issued Dec. 31, 1985, for Electronic Illumination Control. In other words, the geometric division of a light beam can be accomplished by electronically configuring the transmissive geometry of a liquid crystal cell, thus eliminating the need to physically position a carrier to different locations in space.

While the invention has been disclosed with reference to a transmitted light microscope, nothing in the invention prohibits it from being operative in a reflection or fluorescence microscope, and in fact, the invention operates fully in such environments. Once a light beam carrying an image enters the phototube of a trinocular head microscope, the present invention functions exactly as described herein above, regardless of the source of such image-carrying light beam.

While there are presently commercially available dual camera mounts for trinocular head phototubes, it is interesting that such dual camera mounts have been used only to permit 2-D photographing with two different kinds of film (black and white and color, for example). Prior to the present invention, it has never been suggested that the dual mounted cameras for a phototube be used to simultaneously or sequentially record images with sufficient parallax to create a stereo pair 3-D photograph.

As used herein and in the claims, the following terms are to be understood to have the following meanings.

Pupil: the projected image of the rear aperture of the objective lens of the microscope created by an eyepiece immediately above the eyepiece (sometimes known as the "eye point").

Full through-screen: An aperture that permits substantially all of a light beam to pass without modification.

Partial through-screen: An aperture that permits less than all of a light beam to pass (and preferably passes only about half), but otherwise does not modify the beam.

Partial through-screen pair: Two partial through-screens that have mirror image geometry.

Split beam: A beam of light formed from a fraction of another beam of light.

Obviously, many modifications and variations of the present invention are possible in light of the above teachings and as specifically pointed out above. It is, therefore, to be understood that, within the scope of the appended claims, the invention may be practiced otherwise than as specifically described.

What is claimed is:

1. In a 3-D photo attachment for a 2-D light microscope which creates only a 2-D image of a specimen and has an objective lens with a rear aperture and a phototube with an eyepiece through which a light beam from the microscope passes for 2-D photography, wherein such eyepiece creates a pupil, the combination comprising:

a first camera port attached to the phototube;

a second camera port attached to the phototube;

a beam divider attached to the phototube and disposed in close proximity to the eyepiece pupil, said beam divider operative to divide a light beam passing through the eyepiece into first and second split beams which split beams are directed to said first and second camera ports, respectively.

2. The apparatus of claim 1 further comprising:

a mirror positionable to be aligned with the eyepiece pupil in place of said beam divider whereby said mirror directs substantially all of a light beam passing through the eyepiece to only one of said camera ports.

3. The apparatus of claim 2 where in said beam divider and said mirror are further described as being integrally connected whereby positioning of one into alignment with the pupil moves the other out of such alignment.

4. The apparatus of claim 1 further comprising:

a third camera port attached to the phototube into which a light beam passing through the eyepiece passes if not otherwise diverted;

a positionable screen carrier located substantially at the eyepiece pupil and having a number of positions relative to the pupil including a first position and a second position;

a full through-screen located on said screen carrier and aligned with the eyepiece pupil when said carrier is in its first position; and said beam divider further described as being positioned by said screen carrier and aligned with the eyepiece pupil when said screen carrier is in its second position.

5. The apparatus of claim 4 wherein said screen carrier has a third position and a forth position, and further comprising;

two partial through-screens on said screen carrier at locations wherein one of said partial through-screens is aligned with the eyepiece pupil when said carrier is in its third position and the other of said partial through-screens is aligned with the eyepiece pupil when said carrier is in its forth position.

6. The apparatus of claim 5 wherein said two partial through-screens are a partial through-screen pair.

7. In a 3-D photo attachment for a light microscope of the kind having an objective lens with a rear aperture and a phototube with an eyepiece through which a light beam from the microscope passes for photography, wherein such eyepiece creates a pupil, the combination comprising:

a positionable screen carrier located substantially at the eyepiece pupil and having a number of positions relative to the pupil including a first position, a second position and a third position;

a plurality of screens on said positionable screen carrier including a full through-screen which aligns with the pupil when said carrier is in its first position, a first partial through-screen which aligns with the pupil when said carrier is in its second position and a second partial through-screen which aligns with the pupil when said carrier is in its third position.

8. The apparatus of claim 7 wherein said two partial through-screens are a partial through-screen pair.

9. In a 3-D photo attachment for a light microscope of the kind having an objective lens with a rear aperture and a phototube with an eyepiece through which a light beam from the microscope passes for photography, wherein such eyepiece creates a pupil, the combination comprising:

a screen carrier substantially at the eyepiece pupil providing a plurality of different screens for alignment with the eyepiece pupil.

10. The apparatus of claim 9 wherein said plurality of different screens include a full through-screen, a first partial through-screen and a second partial through-screen.

11. The apparatus of claim 10 wherein said first and second partial through-screens are a partial through-screen pair.

12. The apparatus of claim 9 wherein said screen carrier includes an electronically controlled liquid crystal display device.

13. The apparatus of claim 10 wherein said screen carrier includes an electronically controlled liquid crystal display device.

14. In a 3-D photo attachment for a light microscope of the kind having a phototube through which a light beam from the microscope passes for photography, the combination comprising:

an eyepiece disposed within the phototube that creates a pupil; and a screen carrier substantially at said pupil providing a plurality of screens for alignment with the eyepiece pupil.

15. The apparatus of claim 14 wherein said screen carrier has a first, second and third position relative to said pupil and further comprises:

a full through-screen which aligns with the pupil when said carrier is in its first position, a first partial through-screen which aligns with the pupil when said carrier is in its second position and a second partial through-screen which aligns with the pupil when said carrier is in its third position.

16. The apparatus of claim 15 wherein said two partial through-screens are a partial through-screen pair.

\* \* \* \* \*